United States Patent [19]

Binek et al.

[11] 4,291,943

[45] Sep. 29, 1981

[54] CONNECTOR FOR OPTICAL FIBER CABLES

[75] Inventors: Paul H. Binek, St. Paul; Thomas M. Cherney, Roseville; John M. Magnusson, Richfield; Bryon J. Cronk, Hugo, all of Minn.

[73] Assignee: Minnesota Mining and Manufacturing Company, Saint Paul, Minn.

[21] Appl. No.: 123,495

[22] Filed: Feb. 21, 1980

Related U.S. Application Data

[63] Continuation-in-part of Ser. No. 822,269, Aug. 5, 1977, abandoned.

[51] Int. Cl.³ .................................... G02B 5/14
[52] U.S. Cl. ........................................ 350/96.22
[58] Field of Search ............ 350/96.20, 96.21, 96.22, 350/96.23; 339/103 R

[56] References Cited

U.S. PATENT DOCUMENTS

| 3,798,099 | 3/1974 | Marcatili | 350/96.21 X |
|---|---|---|---|
| 3,809,908 | 5/1974 | Clanton | 250/551 |
| 3,972,585 | 8/1976 | Dalgleish et al. | 350/96.21 |
| 4,005,522 | 2/1977 | Dalgleish et al. | 29/517 |
| 4,008,948 | 2/1977 | Dalgleish et al. | 350/96.21 |
| 4,019,048 | 4/1977 | Maione et al. | 455/601 |
| 4,023,886 | 5/1977 | Nakayama et al. | 350/96.21 |
| 4,028,162 | 6/1977 | Cherin et al. | 350/96.21 X |
| 4,082,421 | 4/1978 | Auracher et al. | 350/96.22 |
| 4,111,522 | 9/1978 | Auracher et al. | 350/96.21 |
| 4,186,997 | 2/1980 | Schumacher | 350/96.21 |

FOREIGN PATENT DOCUMENTS

| 1425264 | 2/1976 | United Kingdom . | |
|---|---|---|---|
| 1440806 | 6/1976 | United Kingdom . | |
| 1448975 | 9/1976 | United Kingdom | 350/96.21 |
| 1458897 | 12/1976 | United Kingdom . | |
| 1459380 | 12/1976 | United Kingdom . | |
| 1462920 | 1/1977 | United Kingdom . | |
| 1472343 | 5/1977 | United Kingdom . | |

*Primary Examiner*—John K. Corbin
*Assistant Examiner*—John D. Lee
*Attorney, Agent, or Firm*—Cruzan Alexander; Donald M. Sell; William B. Barte

[57] ABSTRACT

A connector for use with a cable containing a plurality of optical fibers supported in a flexible matrix and disposed parallel to each other, such as in a flat ribbon configuration. The connector includes a substantially flat housing member having a rear opening corresponding in size and shape to a cable to be received. The opening has associated therewith means for anchoring the cable. Passageways through the housing are provided for the individual fibers to be received and anchored within fiber retaining members such that the fiber ends are accessible at the front of the housing to be coupled to fibers within a mated connector. The fiber retaining members are in turn adapted to be received into an abutting relationship within an alignment means which maintains the mated fibers in axial alignment when the connectors are mated. The housing also has associated therewith a latching means on both sides of the flat housing adapted to corresponding members of the mated connector to align the respective members and to maintain the abutting relationship when the respective connectors are mated.

17 Claims, 7 Drawing Figures

CONNECTOR FOR OPTICAL FIBER CABLES

This is a continuation-in-part of application Ser. No. 822,269, filed Aug. 5, 1977, now abandoned.

BACKGROUND OF THE INVENTION

(1) Field of the Invention

This invention relates to fiber optic connectors and in particular to such connectors adapted for use with cables containing a plurality of optical fibers such as may be particularly useful in data communication systems.

(2) Description of the Prior Art

The concept of using optical fibers in data communications is now well established. See, for example, "Fiber Optic Developments Spark Worldwide Interest", R. Gundlach, Electronics, Aug. 5, 1976. Regardless of the desirable features of interference-free, large bandwidth communications which are envisioned, the commercial utilization of such data transmitting links has been impeded by the problems of making reliable, inexpensive and low-loss connections between fibers or between a given fiber and an associated optical element such as a light source or photodetector. Such connections must address at least three types of problems, axial alignment, longitudinal alignment or gap between associated members and angular alignment.

Axial alignment is commonly achieved by use of precision sleeves which conform precisely to the outer diameter of the fiber, thereby guiding fibers inserted therein into axial position such that they may then be secured in place. U.S. Pat. Nos. 3,972,585, 4,005,522, and 4,008,948 (Dalgleish et al) depict various connectors employing sleeves into which exposed fiber ends are directly inserted.

While various systems have been disclosed using fiber optic receiver-transmitter modules, see, for example. U.S. Pat. Nos. 3,809,908 (Clanton) and 4,019,048 (Maione et al), such systems are complex, utilize non-standardized components, and may not be amenable to data communication links where a multiplicity of discrete optical fibers are provided for coupling between a given light source and photodetector.

Recently, a fiber optical cable system has been introduced by Quadri Corporation, Tempe, Arizona (OPTICABLE ™ Model 2403) which includes a single optical fiber cable connecting a transmitter module to a receiver module. That system is designed for use with 0.5 inch (12.5 mm) centered card cage assemblies, but requires separate interfacing receiver and transmitter modules and provides for only one way signal flow.

SUMMARY OF THE INVENTION

In contrast to prior art optical fiber connectors and communications systems in which a bundle of cables are provided or in which isolated fibers are included in a coaxial-like cable, the present invention is directed to a fiber-optic data link system based on the use of a cable containing a plurality of optical fibers supported in a flexible matrix in which the fibers are disposed parallel to each other, and which are preferably disposed in a common plane. Accordingly, the cables will desirably be in either a flat ribbon format or may comprise a "figure-8" cross section, with that portion of the flexible matrix surrounding each fiber being coupled to that surrounding in adjacent fiber by regions of reduced thickness. The advantages of such cables in conventional electrical communications links are now well known, and include advantages including low cost construction, ease of installation in existing building, and low profile, thus achieving an inconspicuous appearance. Despite known advantages in electrical applications, such configured cables containing optical fibers have not been previously commercially available.

The development of such cables has led to the connector of the present invention, which connector includes a substantially flat housing member having internal support means defining a passageway corresponding in shape and size to a cable to be used therewith. The passageway provides access for fibers of the cable received into the housing to protrude beyond the support means and into a channel within the housing such that the ends of the fiber terminate proximate an opening through a front portion of the housing member. The fiber ends are thus accessible through the opening and may be optically coupled to fibers within a mated connector abutting the front portion. The housing member also includes means for securing the flexible matrix of the cable for anchoring the cable to the housing member while yet avoiding strain on the fibers such that repeated insertions and withdrawals of the connector are facilitated without weakening the fibers.

The connector further includes a plurality of fiber retaining members, each of which is adapted to be positioned within a corresponding channel in the housing member in axial alignment with the fiber. Each of these members have a smooth substantially cylindrical periphery and have a circular bore extending therethrough along the cylindrical axis for receiving an end of a fiber and for permanently anchoring the fiber end therein substantially co-planar with the end of the bore, the ends of the fiber and of the retaining member being substantially normal to the axis of the bore.

An alignment means is also provided, having a plurality of bores extending therethrough of substantially the same size and shape as the cylindrical periphery of the retaining members. Each bore of the alignment means is thus adapted to receive one of the retaining members in close fitting relationship at one end, and to receive another retaining member of a mated connector into the other end so as to substantially butt against the first member, thus optically coupling the fibers. Typically, the optical fibers have a circular cross-section, hence the retaining member will preferably comprise a tube having a circular cross-section, the inside diameter of which is slightly larger than the diameter of a fiber to be used therewith such that the fiber may be inserted and anchored therein, such as by a suitable adhesive while yet maintaining the fiber axially centered within. The outside diameter of such tubes are preferably slightly rounded at the end to facilitate insertion into the alignment means. Further, each retaining member is preferably constructed to include a flange to be fitted into the housing in order to position and anchor the member.

Likewise, in that the bore of each alignment member is adapted to receive the periphery, i.e., the outside diameter, of retaining members in close fitting relationship, the ends of those bores are preferably slightly flared. Preferably, the alignment means comprises a plurality of sleeves having an inside diameter slightly greater than that of the outside diameter of the fiber retaining tubes. In such an embodiment, each of the sleeves and tubes preferably include flanges of substantially the same radial size and shape such that when one end of the retaining member is inserted approximately halfway into the bore of the alignment member, both flanges are butted together. The channels in the housing are also shaped to receive the lock together in axial alignment each fiber retaining tube at least partially inserted into one end of its companion sleeve and to position the alignment sleeves such that their ends are accessible through the opening in the front portion of the housing for optical coupling to the mated connector. Preferably, the channels in the housing are provided with cavities corresponding to the dimensions of the butted-up flanges such that the butted-up members inserted into the cavities are anchored within the housing, while yet allowing limited movement between the members to relieve strains on the fibers and to allow slight transverse movement while the connectors are being mated.

The connector may be utilized to optically couple a plurality of optical fibers within a cable to optical fibers within a mated connector. Such a mated connector may be another cable connector which is shaped to receive and anchor another optical fiber cable, the housing of which cable connector is adapted to be mated to the housing of the first cable connector. Alternatively, the mated connector may be a double ended feed-through connector having therein short sections of optical fibers and appropriate fiber retaining members such that two non-hermaphroditic cable connectors may be coupled together. Likewise, the mated connector may consist of a terminal connector utilized to optically couple optical elements such as light sources or detectors therewithin to fibers terminated within a cable connector.

DESCRIPTION OF THE PREFERRED EMBODIMENTS

Figure 1:
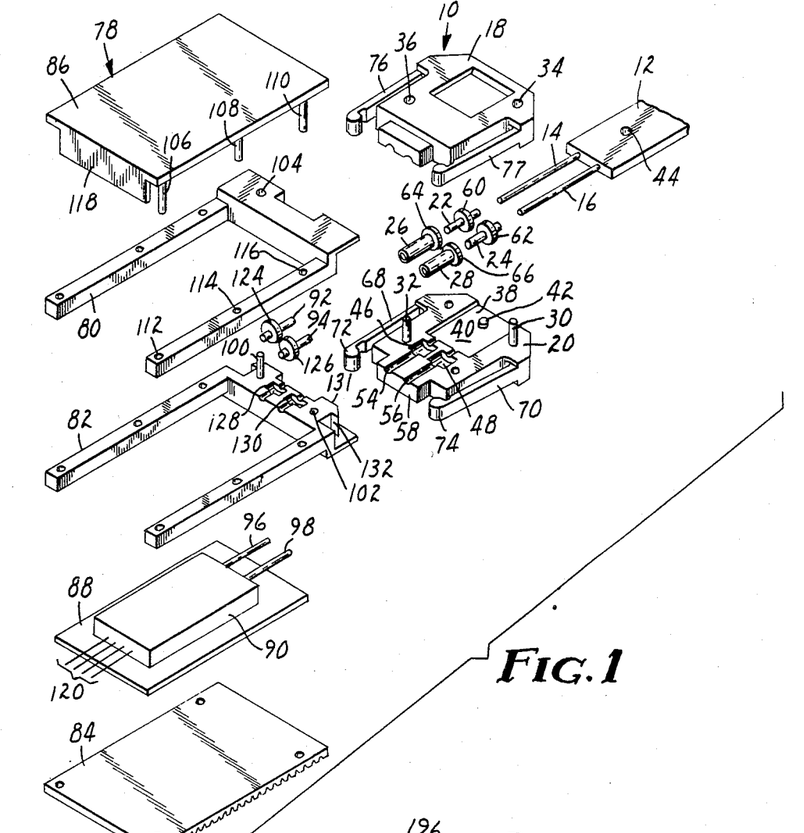
FIG. 1 is an exploded view of a connector assembly utilizing the connector of the present invention to couple a flat ribbon optical fiber cable to a termination connector.

A preferred embodiment of the connector of the present invention is shown in an exploded view in FIG. 1. The connector 10 is adapted for coupling to a flat ribbon optical fiber cable 12 containing a pair of optical fibers 14 and 16, which fibers are transversely separated a sufficient distance to enable the formation of an opening through the cable without intercepting the fibers. The connector comprises two identical housing members 18 and 20, together with a pair of fiber retaining members 22 and 24, respectively, and a matching pair of alignment sleeves 26 and 28. The housing members 18 and 20 are preferably injection molded of a thermoplastic such as polycarbonate or the like. Each member includes projecting pins such as the pins 30 and 32 on member 20 which mate with corresponding openings in the respective opposite member, such as openings 34 and 36 in member 18 such that when the members are pressed together, the pins are pressed into the holes to maintain the connector halves together in appropriate alignment. The interior of the housing members 18 and 20 are shaped to provide a rear opening 38 which defines a passageway 40 corresponding in size and shape to a cable such as that of the cable 12 which is to be received and anchored in the housing. The passageway 40 has an extended planar portion into which the flexible matrix of the cable 12 may be inserted. The flat portion is provided with a projecting pin 42 which mates with a similar pin in the half 18 of the housing. When a cable 12 is to be assembled with the connector, a hole 44 is punched between the transversely separated fibers 14 and 16 through the flexible matrix of the cable 12. This hole thus anchors the cable on the pin 42 within the housing and relieves strain on the optical fibers should pressure be placed on the cable independent of the connector housing. Furthermore, the positioning of a hole 44 in the end of the cable facilitates subsequent jigging operations in order to appropriately position the ends of the fiber within associated connector elements. Extending forward of the passageway 40 and in general alignment with the axis of the optical fibers within the cable 12 are channel means through which the fibers may extend and which includes a pair of larger cavities 46 and 48, respectively. The channel means thus includes a pair of small openings leading from the passageway 40 into the larger cavities 46 and 48, and larger axial openings 54 and 56 which terminate at a forward portion 58 of the connector housing. Each of the cavities 46 and 48 is adapted to receive one of the retaining members 22 or 24 inserted into one of the alignment members 26 or 28, respectively.

The fiber retaining members 22 and 24 comprise a short section of stainless steel tubing press fitted into brass flanges 60 and 62 such that a short end protrudes beyond one side of the flanges, facilitating alignment of the members within the small openings from the passageway 40. Such tubing is commercially obtainable in a variety of inside and outside diameters, and is thus readily selected to provide an inside diameter slightly greater than that of the optical fibers to be utilized therewith. Accordingly, an optical fiber 14 or 16 may be inserted into the retaining members 22 or 24 such that the end of the fiber is substantially co-planar with the end of the retaining member 22 or 24. The fiber is then permanently secured within the retaining member such as with an epoxy resin. The outside diameter of the members 22 and 24 is similarly selected to be received into a close fitting relationship within the alignment members 26 or 28. The radial flanges 60 and 62 are of appropriate size to fit within the larger cavities 46 and 48 while allowing for a slight radial and axial movement therein, thereby providing for strain relief for the fibers and limited freedom of movement to optimize optical coupling therebetween.

The alignment members 26 and 28 are also preferably constructed of brass flanges and stainless steel tubing and are fabricated to have an inside diameter which is slightly greater than the outside diameter of the retaining sleeves 22 and 24. The alignment members 26 and 28 are also provided with radial flanges 64 and 66 of similar size and shape as the flanges 60 and 62 such that when the retaining members 22 and 24 are inserted into the alignment members 26 and 28, the flanges abut and may be jointly received into one of the cavities 46 and 48. The forward portion of each alignment member 26 or 28 may be covered by a resilient sleeve and is thus adapted to tightly fit into the forward portions of the channels 54 and 56 in axial alignment with the cable 12 such that the forward opening portions thereof are accessible through the front portion 58 of the housing. When thus assembled, the fiber retaining members 22 and 24 having the ends of the fibers 14 and 16 permanently anchored co-planar therewith are inserted approximately half-way into the alignment members 26 and 28. These assembled members are received into the cavity such that the forwrd end of each alignment member 26 and 28 protrudes a slight distance ahead of the front portion 58 of the housing. Each alignment member 26 and 28 is preferably swaged or machined as appropriate on both ends to provide flared openings which facilitate entry of a retaining member 22 or 24 into the rear opening and to further facilitate entry of a similar retaining member of a mated connector into the front opening.

The connector further includes a latch providing means for engaging the connectors, such as a pair of resilient flanges 68 and 70, having latching detents 72 and 74 on the forward ends, which fingers are adapted to mate with corresponding members on a mated connector.

The connector halves 18 and 20 are preferably formed of an injection molded plastic and are of identical construction. The upper half 18 thus includes the same cavities as those shown in the lower half 20. When the halves are mated together, portions of each half cooperate to complete the inner cavities. Similarly, the resilient fingers 68 and 70 on the lower half 20 have corresponding counterparts 76 and 77 in the other connector half 18.

In the embodiment shown in FIG. 1, the connector 10 is adapted for use with a flat ribbon optical fiber cable 12 having a pair of optical fibers approximately 10 mils (0.25 mm) diameter embedded with an extruded flexible vinyl matrix having an outer width approximately one-half inch (12.5 mm) and approximately 1/16th of an inch (1.5 mm) thick. The optical fibers are spaced apart approximately one-fourth of an inch (7 mm). In such an embodiment, the connector housings 18 and 20 are approximately ⅛th of an inch (3 mm) thick, approximately one inch (25 mm) overall width, and are approximately one and one-quarter inches (32 mm) in overall length. The platform 40 is shaped to contain the half inch (12.5 mm) by 1/16th inch (1.5 mm) cable 12. Accordingly, the platform portion of each half of the housing 18 and 20 comprises a recess approximately 1/32th of an inch (0.75 mm) by ½ inch (12.5 mm). The projections 42 are similarly shaped to abut with each other when the housings are assembled so as to mate with a hole 44 punched in the cable 12.

The retaining stainless steel sleeves 22 and 24 have an inside diameter approximately 13 mils (0.33 mm) so as to be able to receive the fibers 14 and 16. The fibers are anchored therein by a suitable resin such as epoxy resin Type 96-083 manufactured by Dow Corning Corporation. In the preferred embodiment shown in FIG. 1, the flanges 60, 62, 64 and 66 have an outside diameter approximately 3/16ths of an inch (4.5 mm) and inside diameters enabling them to be press fit onto the steel tubing.

The companion mated terminal connector 78 shown in the left portion of FIG. 1 is adapted to provide a termination interface between optical signals on a fiber cable such as the cable 12 and corresponding electrical signals. The terminal connector 78 includes a housing formed of two identical molded plastic support members 80 and 82, which members are in turn sandwiched between a base member 84 and a cover plate 86. The connector further includes a circuit board 88 on which are positioned electronic circuit components shown generally as 90 as desired for a given application. The connector 78 further includes a pair of fiber retaining members 92 and 94 within which may be anchored short optical fibers 96 and 98 to provide optical coupling between associated optical elements within the electronic circuit module 90 and optical fibers in the other connector 10. The housing halves 80 and 82 are desirably formed of molded plastic such as a polycarbonate resin or the like. Each half contains at least one projecting pin 100 and a corresponding opening 102 such that when the halves are assembled, the pin 100 of one half of the housing is received into a corresponding hole such as the opening 104 in the opposite housing half. The cover member 86 is desirably also formed of injection molded plastic and includes a plurality of projecting pins, three of which are shown as elements 106, 108 and 110, respectively. These pins are designed to be inserted through matching holes shown as elements 112, 114 and 116 in side legs of the members 80 and 82. The base member 84 is similarly provided with a plurality of openings through which the pins corresponding to elements 106, 108 and 110 may be inserted when the connector is assembled. Following assemblage, the projecting pins may then be staked to permanently lock the assembly together. A rear end portion 118 on the cover plate 86 closes the rear portion of the termination connector 78 while allowing access for electrical connections 120 to extend from the electronic module 90. The fiber retaining members 92 and 94 are substantially identical to the retaining members 22 and 24 in the first recited connector 10 and are made of stainless steel tubing press-fit within brass flanges 124 and 126. These members fit within appropriately shaped recesses 128 and 130 within the support members 80 and 82 such that the front end protrudes beyond a front portion 131 of the members 80 and 82.

The optical fibers 96 and 98 may be permanently anchored within the retaining members 92 and 94 with a front end of the fibers substantially co-planar with the ends of the members 92 amnd 94. The rear end of the fibers may then be optically coupled to associated optical elements (not shown) within the electronic module 90, such as by a transparent adhesive, mechanical clips or the like.

The support members 80 and 82 are further shaped to have matching latch means such as the indented portions positioned on the opposite sides of the members, one of which is shown as element 132. The indented portions are thus adapted to receive the ends of the resilient fingers 72 and 74 and 76 and 77 of the first recited connector so as to lock the connectors together and maintain the respective fiber retaining members substantially butted together and in axial alignment wihtin the alignment members 26 and 28.

While the members shown in FIG. 1 may all be formed of injection molded plastic, in a particularly preferred embodiment, the base member 84 may be desirably constructed to include a heat conducting metal or the like having means such as a corrugated outer surface for providing additional heat dissipation. In such an instance, the circuit board 88 may be desirably constructed of an insulating material such as an electronic grade ceramic.

In the connector 10 shown in the right portion of FIG. 1, the alignment members 26 and 28 are included within the housing members 18 and 20 and the fiber retaining members 22 and 24 are inserted into one end of the alignment members 26 and 28. When the connectors 10 and 78 are mated, the second set of retaning members 92 and 94 retained within the members 80 and 82 of the mated connector 78 are inserted into the alignment members 26 and 28 such that the front portions of both sets of fiber retaining members are abutted together, thereby optically coupling together the fibers anchored therein. Similarly, it is within the scope of the present invention that the alignment members 26 and 28 may be positioned in either of the mated connectors, it being essential only that the fiber retaining members of each connector be inserted into the alignment members such that the retaining members become butted together in axial alignment so as to appropriately optically couple the optical fibers retained therein.

Figure 2:
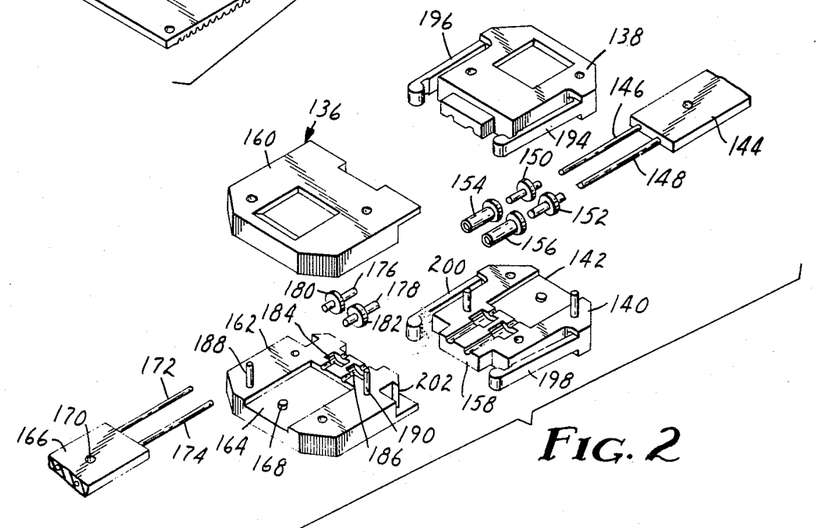
FIG. 2 is a similar exploded view of connectors of the present invention adapted for coupling or splicing together flat ribbon optical fiber cables.

In another embodiment of the present invention shown in FIG. 2, the connectors are adapted to couple or splice together a pair of flat ribbon optical fiber cables. In such an embodiment, the housing of connector 134 is formed of injection molded plastic in identical members 138 and 140, while the housing of connector 136 is injection molded in two identical members 160 and 162. The connector 134 is substantially the same as the connector 10 shown in FIG. 1 and includes an opening into a platform 142 having means such as a projection thereon for receiving and anchoring a flat ribbon optical fiber cable 144 having a pair of optical fibers 146 and 148 therein. The respective housing members also include a pair of channels into which may be received a pair of fiber retaining members 150 and 152 inserted into and abutted against respective alignment members 154 and 156, and resilient fingers 194, 196, 198 and 200 proximate the side portions of the respective housing members as described in conjunction with FIG. 1. A front portion 158 of the housing is provided with openings through which the front of the alignment members 154 and 156 may protrude, thus allowing access into the retaining members 150 and 152 for optically coupling two fibers 146 and 148 anchored therein.

In this embodiment, the mated connector 136 is provided with an opening into a platform 164 for receiving and anchoring a cable 166. The platform includes a projection 168 which mates with a hole 170 punched between the optical fibers 172 and 174 of the cable 166 such that the cable is anchored within the housing when the members 160 and 162 are assembled by inserting the mating projections 188 and 190 into corresponding holes in the opposite members. The connector 136 also includes a pair of fiber retaining members 176 and 178 into which the fibers 172 and 174 of the cable 166 may be anchored such that the ends of the fibers are substantially parallel with the front end of the retaining members 176 and 178. When these members are inserted into the corresponding cavities 184 and 186 and the members 160 and 162 are pressed together, the fiber ends of the two cables 144 and 166 may then be coupled by pressing the connector halves together, such that the ends of the respective sets of fiber retaining means 150 and 152 and 176 and 178, respectively, are butted together within the alignment means 154 and 156. When thus inserted, the resilient fingers 194, 196, 198 and 200 of the right hand connector 134 are received into the indented portions 202 of the mated connector 136 so as to lock the respective members substantially butted together and in axial alignment.

While the connectors shown in FIGS. 1 and 2 are depicted for use with a flat ribbon cable having a pair of optical fibers contained therein, it is similarly within the scope of the present invention that the connectors may be expanded so as to provide for coupling of any number of optical fibers contained within a cable. Similarly, while the connectors are depicted as having mechanical means for aligning and maintaining each connector half in an aligned relationship, it is similarly within the scope of the invention that the connector halves may be heat-fused or bonded together adhesively, and may be of dissimilar shapes depending upon the specific application required. Similarly, while in the embodiments shown in FIGS. 1 and 2 the housings anchor the cable via a projection mating with holes punched in the cables, it is within the scope of the present invention that other mechanical holding means such as a molded bar across the platform 142 and 164 may be utilized.

Figure 3:
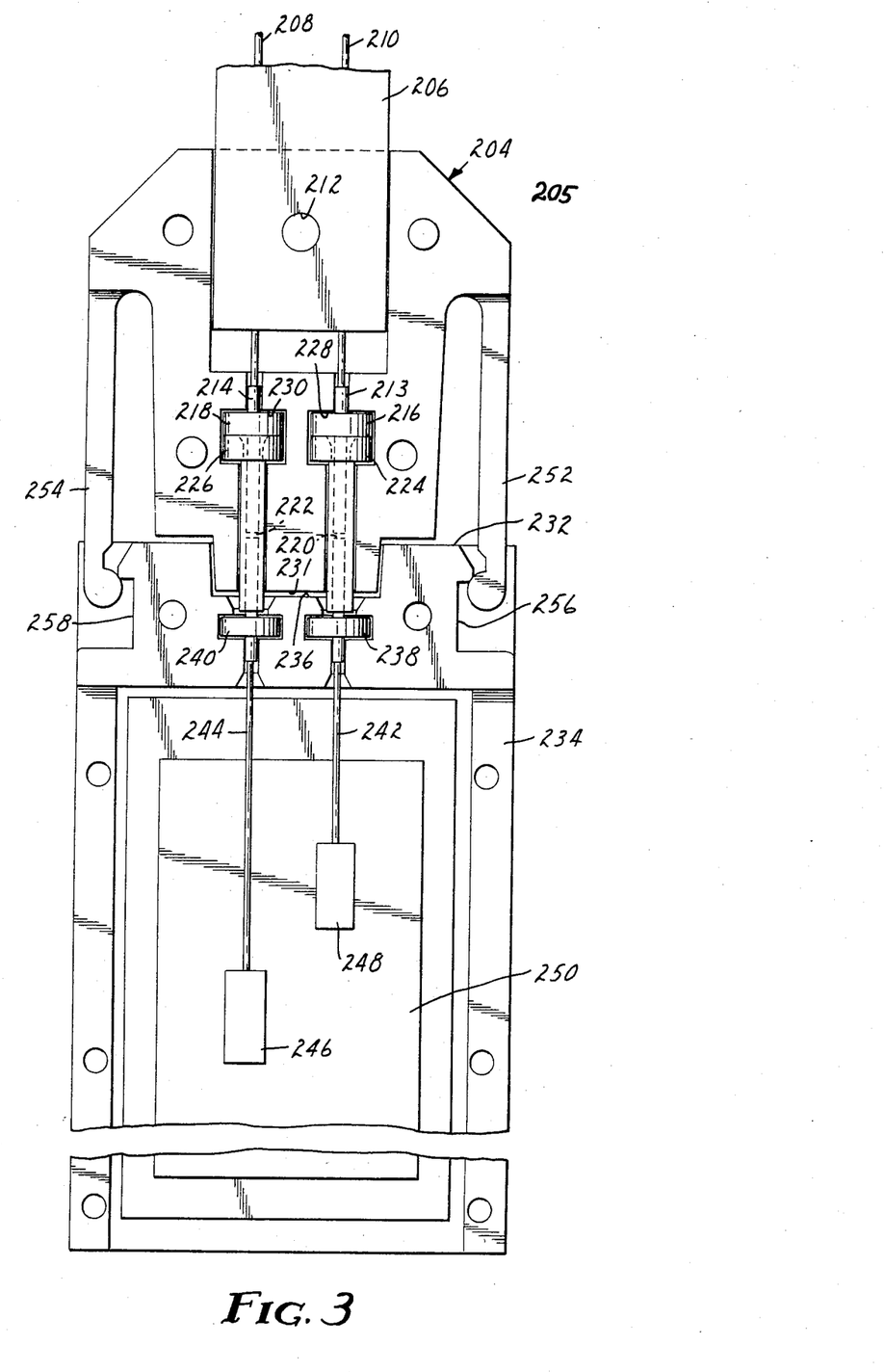
FIG. 3 is a plan view of the connector assembly of FIG. 1, with the top half removed.

The details of the mated connectors adapted for coupling an optical fiber cable to a termination module are shown in the cross-sectional view of FIG. 3 in which the connectors are slightly spaced apart for improved clarity. In this figure, a connector 204 substantially like that of FIG. 1, is shown to have secured thereto a flat ribbon optical fiber cable 206 in which a pair of optical fibers 208 and 210 are embedded. The cable is anchored to the housing by means of a projecting pin 212 which protrudes through a similarly shaped opening in the cable 206 between the fibers 208 and 210. The fibers 208 and 210 thus protrude in axial alignment with the cable through the channels 213 and 215 and enter a respective fiber retaining member 216 and 218 within which the fiber ends are permanently anchored by means of a suitable adhesive such as the epoxy resin type 96-083 manufactured by Dow Corning Corporation.

During assembly of the connector and optical fiber cable, once the opening into which the projecting pin 212 is to be inserted has been punched within the cable 206 such that a suitable length of the cable protrudes beyond the location of the hole, the flexible matrix of the cable is then removed such that a suitable length of fibers 208 and 210 extends beyond the end of the flexible matrix. The cable is subsequently inserted into a suitable jig (not shown) having a projecting pin and cavities into which the cable and the fiber retaining members 216 and 218 are positioned, such that the location of the retaining members may be accurately positioned with respect to the opening through the cable. The optical fibers are inserted into the retaining members and are then cut off slightly projecting beyond the forward ends. The fibers are then permnently anchored therein as described above. The respective ends are ground and polished smooth, preferably as set forth in U.S. Pat. No. 4,148,554 of Messrs. Magnusson and Cronk, which patent was filed on Aug. 5, 1977. According to that invention, the ends of the fibers thus become recessed within the ends of the respective retaining members, thereby avoiding subsequent chipping or scratching of the fiber ends. When the fibers and respective retaining members are thus assembled, they are inserted into the alignment members 224 and 226 such that the flanges on both sets of members are butted together. The butted together flanges are then inserted within the cavities 228 and 230 of the housing assembly and the respective halves of the assembly are pressed together as described hereinabove.

In a similar fashion, the termination connector includes a housing member 234 which is adapted to mate with the housing of connector 204. Thus the housing member 234 includes a front portion 236 which is adapted to mate with the front portion 231 of the first recited connector 204. The connector further includes a pair of retaining members 238 and 240, which members have anchored therein a short optical fiber pigtail 242 and 244. The members 242 and 244 are permanently anchored within the respective retaining members 238 and 240 by suitable adhesive means as described hereinbefore such that the fiber ends are proximate the front portion of the retaining members. The members are then mounted within corresponding cavities within the housing 234 so as to maintain the optical fiber pigtails in axial alignment with the front portion 236 of the housing 234. Upon coupling of the connector with the connector 204, the retaining members 238 and 240 are inserted into the alignment members 224 and 226 of the connector 204 so as to cause the optical fibers therewithin to be optically coupled. The end portions of the fibers 242 and 244 are optically coupled to a light source 246 and to a photodetector 248, respectively, mounted within the electronic module 250. In a preferred embodiment, the light source 246 may be a light emitting diode such as Type FPX-2000, manufactured by Fairchild Semiconductor Corporation. Similarly, in a preferred embodiment, the photodetector 248 may be a photodiode such as Type C-30807 manufactured by RCA Corporation. Electrical inputs and outputs to and from the light source 246 and photodector 248 may be provided in a conventional manner such as by leads (not shown).

Preferably, the alignment members 224 and 226 are tapered at both ends to facilitate entry to the respective retaining members 216, 218 and 238, 240. Further, the forward portion 236 of the housing member 234 is shaped such that when the retaining members 238 and 240 are inserted into the corresponding cavities there provided, the forward ends of the retaining members protrude beyond the plane of the front portion such that the end of the retaining members and the respective optical fiber anchored therein may be ground and polished as described hereinabove. Also, the front portion 236 is desirably relieved such that the corresponding front portion 231 may be entered into the relieved portion 236 to provide a firm connection while the resilient fingers 252 and 254 are mated with the corresponding indent portions 256 and 258 of the housing 234.

By thus first positioning the optical fiber pigtails 242 and 244 within their respective retaining members 238 and 240, the end of the pigtails may then be connected to the respective associated optical element to maximize optical coupling. In the event a light emitting diode is used as the light source 246, the positioning may particularly be optimized inasmuch as such diodes frequently emit nor uniformly across the light emitting surface. Accordingly, the most optimum position for the fiber with respect to the emitting surface of the source 246 may be determined by monitoring the light output at the forward end of the fiber 242 and by then permanently anchoring the fiber adjacent the particular portion of the light emitting surface found to correspond to the maximum light output. When the fibers are permanently anchored such as by means of a suitable light transmitting adhesive, the respective halves of housing 234 may be joined as described hereinabove, thus completing the connector assemblies.

In the embodiments described hereinabove, the flat connector housings are shown to include resilient fingers providing means for engaging the respective connectors. It is similarly within the scope of the present invention that such latch means may also include captured screws and associated threaded portions in the mated connector. Likewise, additional sealing means such as rubber gaskets and outer shrouds and the like may be included to provide environmental protection. In a further preferred embodiment, the cavity within which the electronic module 250 is positioned may be provided with electrical shielding means to minimize electrical interference.

In addition to the embodiments disclosed above in which the recited connectors have been adapted for particular use with flat ribbon optical fiber cables, the present invention is also suitable for use with similar cables also containing a plurality of optical fibers in which the fibers are arranged parallel to each other and preferably in a common plane. One embodiment of such a cable, referred to as a figure-8 cable, comprises a pair of optical fiber cables, each of which is surrounded by a flexible matrix, which matrices are joined together by a region having a reduced thickness resulting in a "figure-8" cross section. Such a cable and a pair of cable connectors adapted for coupling such a cable are set forth in FIGS. 4 and 5.

Figures 4, 6:
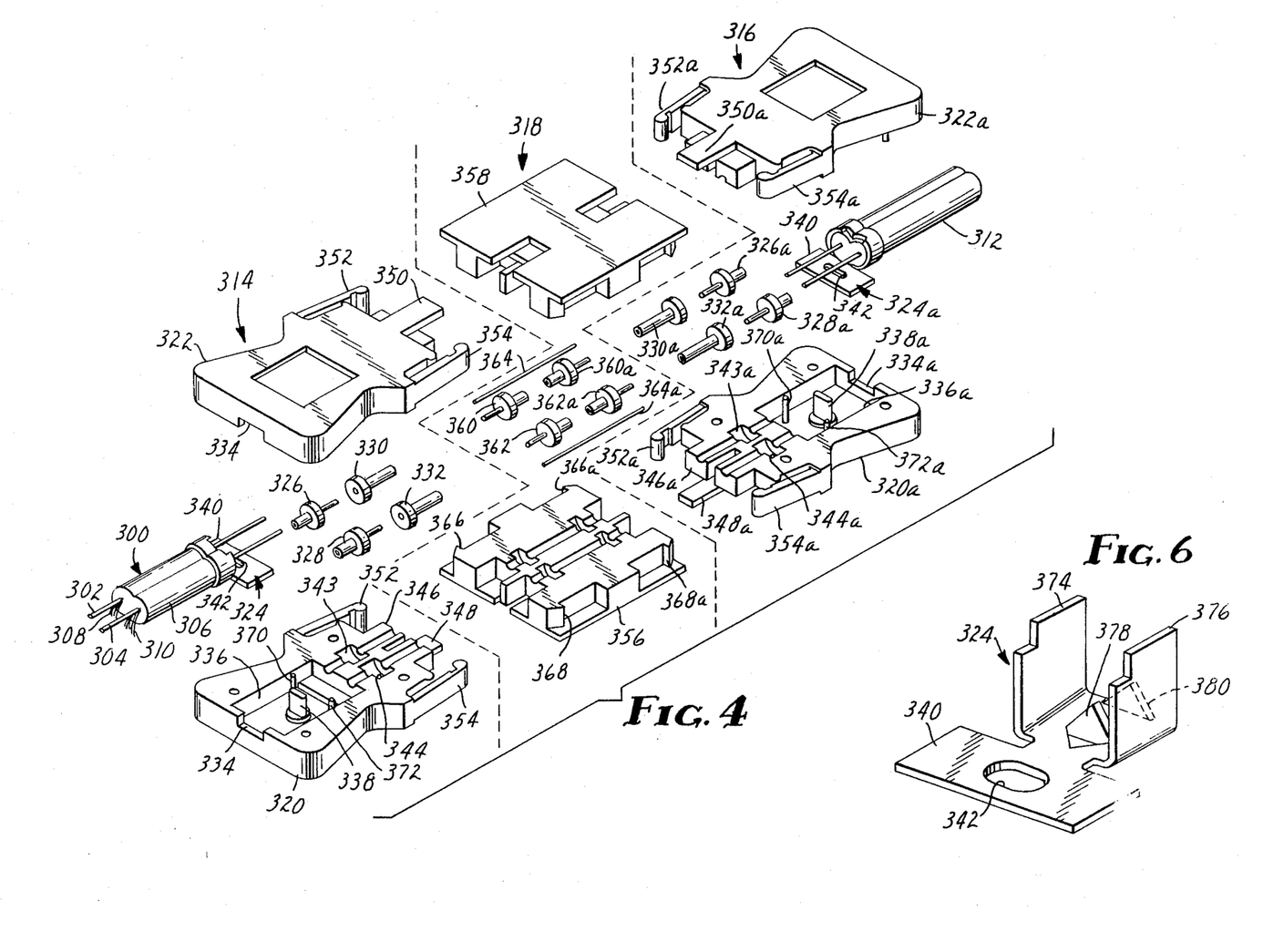
FIG. 4 is an exploded perspective view showing two "figure-8" type cables coupled together via cable connectors interconnected with a feed-through connector.
FIG. 6 is a perspective view of the cable clamp member for use in the cable connectors shown in FIGS. 4 and 5.

As seen in the exploded view of FIG. 4, such a cable 300 comprises a pair of optical fibers 302 and 304, molded within a flexible matrix 306, together with strength members 308 and 310 so as to provide a cable construction having an outer configuration very much like an ordinary electrical lamp cord. The optical fibers used therein may be any fibers such as are typically utilized in the optical data communications. For example, the fibers may comprise a high index silica core having an outer diameter of 200 micrometers, surrounded by a low index silicone resin clad approximately 50 micrometers thick, around which is a 75 micrometer thick protective jacket formed of an organic material such as vinyl, a copolymer of ethylenetetrafluoroethylene, or the like. The flexible matrix 306 may similarly be formed in a conventional fashion of vinyl or like materials. If desired, other fibers such as a graded index plastic clad silica fiber may be used. Depending upon the dimensions of the fibers and the flexible matrix selected for use the dimensions of the housing and other components within the connector itself will have to be appropriately dimensioned.

As shown in the exploded view of FIG. 4, the cable 300 and a matching cable 312 are adapted to be connected via a first cable connector 314, a second cable connector 316 and a feedthrough connector 318. Each of the cable connectors 314 and 316 are identical, being formed of an identical lower housing member 320 or 320a, an upper housing member 322 or 322a, an anchoring clip 324 or 324a, fiber retaining members 326 or 326a, and 328 or 328a, and alignment members 330 or 330a, and 332, or 332a, respectively. As previously indicated with regard to FIGS. 1 through 3, the lower and upper housing members 320 or 320a and 322 or 322a, respectively, are preferably injection molded of a thermoplastic material such as polycarbonate or the like. Preferably, the upper members 322 and 322a include projecting pins (not shown) which mate with corresponding openings in the lower housing members 320 and 320a such that when the members are pressed together, the pins are received into the holes to thereby maintain the connector halves in appropriate alignment. The interior of the housing members 320, 320a, 322, 322a are shaped to provide a rear opening and support means 334 and 334a, which corresponds roughly in size and shape to the cross section of the "figure-8" cables 300 and 312, which are to be received therein. Coupled to the rear opening 334 or 334a is an interior cavity 336 or 336a, into which the flexible matrix 306 of the cables may be inserted. The cavity 336 or 336a is provided with a projecting post 338 or 338a to which the flexible matrix 306 of the cables may be secured, to thereby anchor the cable to the housing member while yet avoiding strain on the fibers such that repeated insertions and withdrawals of the connector is facilitated without weakening the fibers. The securing of the matrix to the post 338 or 338a is effected by means of the anchoring clip 324 or 324a, which clip is provided with a base portion 340, in which a hole 342 has been provided, which hole is thus adapted to mate with the projecting post 338 or 338a. The details of such a clip are shown in FIG. 6. Similarly, as indicated with respect to the connector of FIGS. 1 through 3, the positioning of the anchoring clip on the flexible matrix facilitates subsequent jigging operations in order to appropriately position the ends of the fiber within the associated connector elements. Extending forward of the cavity 336 or 336a and in general alignment with the axis of the optical fibers within the respective cables, are channels through which the fibers may extend and which include a pair of larger cavities 343 or 343a and 344 or 344a. The channel means thus includes a pair of axial openings leading from the internal cavity 336 or 336a into the larger cavities 343 and 344, and longer axial openings leading from the larger cavities and terminating at a forward portion 346 or 346a of the connector housing. Each of the cavities 343 and 344 is adapted to receive one of the retaining members 326 or 328 when inserted into one of the alignment members 330 or 332, respectively. Further, each half of the connector housings is provided with a front facing projection, 348 or 348a, on the lower housing member 320 or 320a, and 350 or 350a respectively on the upper housing member 322 or 322a respectively. These projections on the upper and lower housing members are desirably of different sizes such that when received into a correspondingly sized opening in a method connector, they provide means for polarizing the connector to maintain appropriate orientation of the respective fibers. Finally, each of the connector halves is provided with suitable detent means 352, 352a and 354, 354a, such as flexible fingers on both sides of each connector half to provide suitable locking means to maintain the respective connectors in a butted together relationship when the connectors are mated together.

The fiber retaining members 326, 326a and 328, 328a may be identical to the members 22 and 24 previously discussed in conjunction with FIGS. 1 through 3. Accordingly, they are constructed of a short section of stainless steel tubing press fitted into brass flanges, such that a short end protrudes beyond one side of the flanges, while a longer end protrudes beyond the other side of the flanges, which longer end is adapted to be received into a close fitting relationship within the alignment members 330 or 332.

A particularly desired construction of the fiber retaining members, including a modification enabling strain relief to be provided for the optical fibers 302 or 304 is set forth in detail in FIG. 7 and will be discussed in conjunction therewith hereinafter. Regardless of the particular preferred construction selected for use, the rear facing portion of the passageway next to the larger cavities 343 and 344 in each connector housing will be appropriately shaped to receive the rear portion of the fiber retaining member. As recited hereinabove, when a cable is being fitted to a connector, the fibers will be inserted into the respective fiber retaining members and the fiber secured therewithin such as with an epoxy resin.

The alignment members 330 and 332 are also substantially identical to that discussed hereinabove in conjunction with FIGS. 1 through 3. In another preferred embodiment, the members 330 or 332 comprise a brass flange having an appropriately sized steel tubing press fitted therein. In such an embodiment, the rear facing portion of the brass flange may be machined to have a flared opening to receive the forward facing steel tube portions of the fiber retaining members, while the front facing portions of the steel tubing of the alignment members 330 and 332 may be swaged to provide a flared forward facing opening. The steel tubing may be covered with an elastomeric material such as a vinyl covering. The forward facing channels adjacent the larger cavities 343 and 344 in each connector housing is appropriately dimensioned to allow the forward portion of each alignment member to be tightly received therein. When thus assembled, the fiber retaining members 326 and 328, having the ends of the fibers 302 and 304 anchored coplanar therewith, are inserted approximately halfway into the alignment members 330 and 332. These assembled members are then received into the cavity such that the forward end of each of the alignment members 330 and 332 protrudes a slight distance ahead of the front portion 346 of each housing member.

Also shown in FIG. 4 is a feedthrough connector 318 which connector includes several components substantially identical to those included within the cable connectors 314 and 316. The feedthrough connector 318 includes a lower and upper housing member 356 and 358, respectively, two pair of fiber retaining members 360, 360a and 362, 362a, respectively, and two short optical fiber pigtails 364 and 364a, respectively. The upper and lower housing members 356 and 358 are provided with passageways therein adapted to receive the fiber retaining members 360 and 362, together with the pigtails 364 and 364a inserted therethrough, into the passageways such that when the two housing members are assembled together, the members with the inserted pigtails therein are firmly secured in place. The fiber retaining members 360 and 362 are identical to the members 326 and 328 discussed in conjunction with the cable connectors 314 and 316. The insertion, anchoring and polishing of the fiber pigtails 364 and 364a within the retaining members 360 and 362 is done in a manner substantially identical to that discussed hereinabove, and thus needs no further discussion.

The upper and lower housing members 356 and 358 are similarly shaped to have matching latch means such as the indented portions 366, 366a and 368, 368a which are positioned on opposite sides of each housing half, and which are thus adapted to receive the ends of the resilient fingers 352 and 354 so as to lock the connectors together and to maintain the respective fiber retaining members within the alignment members 330 and 332 substantially butted together and in axial alignment.

It should be noted that, depending upon the manner in which the fiber ends are polished within the fiber alignment members, the relative dimensions of the alignment members may be altered as desired. For example, if the fibers are finished to provide slightly recessed ends as discussed in the Magnusson and Cronk patent referenced above, the alignment and housing members may be dimensioned so as to allow the forward ends of each of the fiber retaining members to physically touch each other, the fibers being prevented from scratching by the slightly recessed characteristics. Alternatively, if the fibers are polished coplanar with the forward ends of their respective fiber retaining members, then the alignment members 330 and 332 preferably will be dimensioned slightly longer than the combined length of the forward portions of each of the fiber retaining members 326 and 326a which face each other, such that when they are received into an alignment member 330 or 332, the fiber retaining members are substantially butted together, being in fact slightly separated so as to prevent scratching of the coplanar fiber ends.

Figure 5:
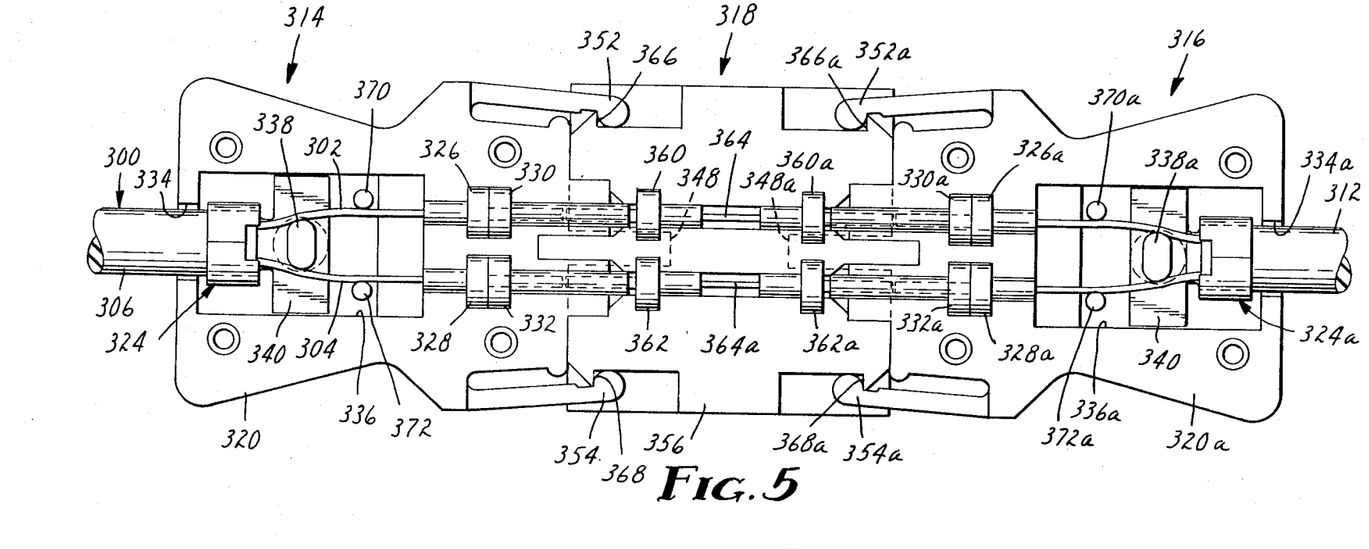
FIG. 5 is a plan view of the cable assembly of FIG. 4, with the top half removed.

The connector assembly shown in perspective view in FIG. 4 is set forth in greater detail in the plan view of FIG. 5. For example, it may there be seen that the interior cavity 336 or 336a of each connector is further provided with a second pair of projecting posts 370, 370a, and 372, 372a. These posts are desirably provided to interact with the projecting posts 338 or 338a to provide a fiber alignment means to steer the fibers from the close spacing of approximately 0.125 inch (3.2 mm) separation provided within the figure-8 cable 300 to the 0.25 inch (6.3 mm) spacing utilized within each respective connector member. It may further be noted that each of the fiber retaining members 326, 328, 360 and 362 of the cable connectors 314 or 316 and of the feedthrough connector 318, respectively, are held in axial alignment within the alignment members 330 or 332, respectively. Also, the latch means including the flexible fingers 352 and 354 interacting with the indent means 366 and 368 of the feedthrough connector are there clearly shown in coupled configuration.

The anchoring clip 324 is shown in more detail in FIG. 6. As is there set forth, such a clip is desirably stamped from a brass sheet, and includes the base portion 340 with the hole 342 punched in the center portion thereof as set forth hereinabove. In addition thereto, such a clip further includes two projecting legs 374 and 376, which are adapted to be crimped onto a fiber cable received therebetween, thereby forcing the cable onto two projecting points 378 and 380, causing the flexible matrix of the cable to thereby be securely anchored. Upon insertion of a cable into the clip such that the forward end of the flexible matrix terminates substantially coplanar with the forward end of the projecting legs 374 and 376, the strength members 308 and 310 shown in FIG. 4, are desirably twisted together, folded back and centered at the bottom of the cable so as to be brought into contact with the projecting points 378 and 380. Accordingly, when the legs 374 and 376 are crimped down onto the cable, the strength members will be firmly pressed into the flexible matrix, thereby further securely anchoring the flexible matrix to the anchoring clip, and thereby relieving strain on the fibers. While such a clip is desirably stamped from brass stock, it is further within the scope of the present invention that a similar suitable anchoring clip may be formed from a molded plastic assembly adapted with a flexible hinge portion so as to enable the flexible matrix to be received therein and a clamp member secured thereover. Such a clip can similarly be provided of molded plastic parts which are easily bonded together upon assemblage. One molded plastic component may be constructed from an appropriately modified connector such as that shown in U.S. Pat. No. 3,388,370 (Elm).

Figure 7:
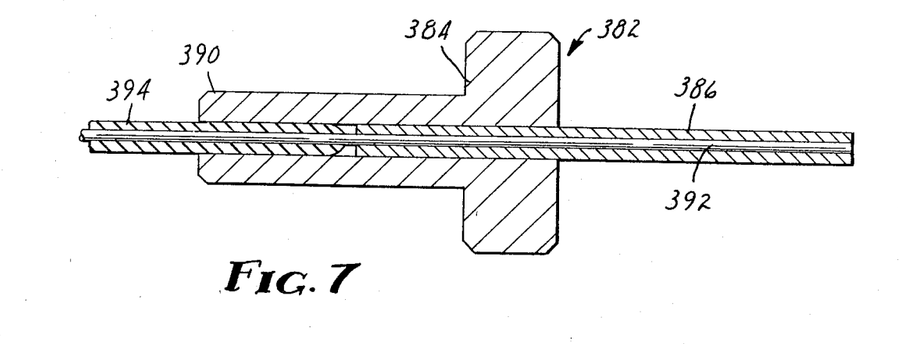
FIG. 7 is a cross sectional view of a preferred embodiment of a fiber retaining member used in the connectors of the present invention.

A preferred embodiment of a fiber retaining member 382 is shown in FIG. 7. In that figure it may be seen that such a member comprises a machined brass collar and flange 384 into which is press fit a stainless steel tubing 386 having an inner diameter which is appropriately sized to receive the optical fiber 392 in axial alignment. The inside diameter of the collar portion 390 is dimensioned to receive the plastic protective jacket 394 which surrounds each fiber in a tight fitting relationship so as to provide additional strain relief and stress protection for the relatively brittle fiber 392. The outside diameter of the collar portion 390 is desirably substantially the same as the outside diameter of the alignment members 330 or 332 such that the passageway through each of the housing members both forward and rearward of the larger cavities 343 and 344, as shown in FIG. 4, may be of similar dimensions. While both the flange and the collar of the member 384 shown in FIG. 7 are shown to be formed of one machined portion of brass stock, it is similarly within the scope of the present invention that such a member may be formed of separate portions, press fit together, or may be made of formed molded plastic, or similar materials.

Having thus described the present invention, what is claimed is:

1. A connector for use with a flat cable containing a plurality of optical fibers supported in a flexible matrix and disposed parallel to each other, comprising
   (a) a substantially flat housing member having
      (i) internal support means defining a passageway corresponding in shape and size to a said cable for receiving and anchoring thereat an end of a said cable such that fibers of a cable received into the housing member may protrude beyond said support means, and
      (ii) including means for securing said flexible matrix for anchoring said cable to said housing member while yet avoiding strain on the fibers such that repeated insertions and withdrawals of the connector is facilitated without weakening the fibers, and channel means in general alignment with said support means for receiving the fibers of a said cable with the ends of the fibers terminating proximate an opening through a front portion of the housing member to enable the fiber ends to be optically coupled to fibers within a mated connector abutting said front portion,
   (b) a plurality of fiber retaining members adapted to be positioned within said channel means in the housing member, in axial alignment with the fibers, each of said retaining members having a smooth substantially cylindrical periphery and circular bore extending therethrough along the cylindrical axis and through which an end of an optical fiber of said cable may be inserted and anchored substantially coplanar with one end of the bore, the ends of the fiber and of the retaining member being substantially normal to the axis of the bore, (c) an alignment means having bores extending therethrough of substantially the same size and shape as the cylindrical periphery of the retaining members for receiving each of said fiber retaining members into one end thereof and for receiving into the other end thereof fiber retaining members of a mated connector enabling the respective received members to be substantially butted together to optically couple fibers enclosed therein while maintaining the thus coupled fibers in axial alignment, and (d) engagement means positioned proximate side portions of the housing member having members adapted to be coupled to corresponding members of a said mated connector to cause said retaining members to be aligned with and received into the alignment means and to be maintained in said abutting relationship within the alignment means.

2. A connector according to claim 1, wherein the alignment means comprises at least a pair of sleeves anchored within the channel means of the housing member, one end of which terminates proximate the front portion of the housing member to enable a portion of the fiber retaining members of the first recited connector to be inserted in close fitting relationship and to enable fiber retaining members of the mated connector to be inserted therein and butted against the other fiber retaining members.

3. A connector acording to claim 2, wherein the fiber retaining members and the alignment sleeves both include flanges of substantially the same size and shape periphery, the flange on the fiber retaining members being positioned along those members such that when one end of one of those members is inserted approximately halfway into the bore of the alignment sleeve, both flanges are butted together, and wherein the channel means of the housing member includes a cavity of approximately the same size and shape as the butted together flanges such that the thus assembled members are anchored within the housing member when inserted into the cavity.

4. A connector according to claim 3, wherein the butted together flanges are mated with the cavity within the housing member to allow a slight radial and axial movement of the flanges within the cavity, thereby providing strain relief for the fibers and freedom for movement to optimize optical coupling therebetween.

5. A connector according to claim 1, wherein the engagement means comprises resilient fingers including detent means for mating with corresponding means of the mated connector when at least a predetermined threshold force is applied between the respective connectors.

6. A connector according to claim 1, wherein the internal support means of the housing member includes mechanical holding means for anchoring said flexible matrix of the cable to the housing while yet avoiding strain on the fibers such that repeated insertions and withdrawals of the respective connectors and associated pressure on the cable is facilitated without weakening of the optical fibers.

7. A connector according to claim 1, wherein said housing member comprises two identical halves, each half having a surface adapted to mate with the other half, said surface having positioned thereon index pins and openings such that the halves may be mated by inserting the pins into corresponding holes to maintain alignment of the respective halves.

8. A connector according to claim 1, wherein said housing is formed of injection molded plastic.

9. A connector according to claim 1, wherein said mated connector comprises at least one additional set of fiber retaining means, and another substantially flat housing member having a passageway for receiving at least a pair of optical fibers protruding into the passageway and anchored within said additional set of fiber retaining means, said another housing member having an opening at a front portion through which the additional set of fiber retaining means may protrude to facilitate mating with the fiber retaining means of the first recited connector, and another engagement means adapted for mating with the engagement means of the first recited connector housing, the connectors interacting such that optical fibers inserted into and anchored within associated fiber retaining members are optically coupled when the respective fiber retaining members are inserted into the alignment means such that the ends of the respective retaining members and the fibers therein are substantially butted together with the fiber ends adjacent each other and are maintained in axial alignment upon connection of the mated connectors.

10. A connector according to claim 9, wherein said housing member of said mated connector includes internal support means proximate said passageway for receiving and anchoring therein an end of another flat fiber ribbon cable containing at least a pair of optical fibers such that said fibers of that cable may protrude into the passageway and be anchored within said another set of fiber retaining means.

11. A connector according to claim 10, wherein said mated connector includes a housing comprising two identical halves, each half having a surface adapted to mate with the other half, said surface having positioned thereon index pins and openings such that the housing may be assembled by pressing the surfaces together, the pins being received into corresponding holes to maintain alignment of the respective halves.

12. A connector according to claim 1, wherein the mated connector is adapted for terminating an optical data link and comprises another set of fiber retaining means and a housing for receiving and positioning therein said another set of fiber retaining means adapted for receiving and anchoring optical fibers therein and an electronic circuit means including an associated optical element such as a light source or photodetector such that optical fibers anchored within said another set of fiber retaining means provides optical coupling between the associated optical elements and optical fibers of the first recited connector upon connection of the mated connectors.

13. A connector for use with a flat ribbon cable containing a plurality of transversely separated optical fibers supported in a flexible matrix, comprising (a) a substantially flat housing member having
 (i) internal support means defining a passageway corresponding in shape and size to a said cable for receiving thereat an end of a said ribbon cable such that fibers of a cable received into the housing member may protrude beyond said support means,
 (ii) an associated projection adapted to mate with an opening between the transversely separated fibers of the cable to provide strain relief for the cable while avoiding associated strain on the fibers therein, said opening in the cable further enabling referencing a selected length of optical fibers there-from to facilitate positioning within the housing member, and (iii) channel means in general alignment with said support means, and for receiving the fibers of a said cable with the ends of the fibers terminating proximate an opening through a front portion of the housing member to enable the fiber ends to be optically coupled to fibers within a mated connector abutting said front portion;

(b) a plurality of fiber retaining members adapted to be positioned within said channel means in the housing member, in axial alignment with the fibers, each of said retaining members having a smooth substantially cylindrical periphery and circular bore extending therethrough along the cylindrical axis and through which an end of an optical fiber of said cable may be inserted and permanently anchored substantially coplanar with one end of the bore, the ends of the fiber and of the retaining member being substantially normal to the axis of the bore;

(c) an alignment means having bores extending therethrough of substantially the same size and shape as the cylindrical periphery of the retaining members for receiving each of said fiber retaining members into one end thereof and for receiving into the other end thereof fiber retaining members of a mated connector enabling the respective received members to be butted together to optically couple fibers enclosed therein while maintaining the thus coupled fibers in axial alignment; and (d) engagement means positioned proximate side portions of the housing member having members adapted to be coupled to corresponding members of a said mated connector to cause said retaining members to be aligned with and received into the alignment means and to be maintained in said abutting relationship within the alignment means.

14. A connector for use with a cable containing a plurality of optical fibers supported in a flexible matrix and disposed parallel to each other, comprising (a) a substantially flat housing member having (i) internal support means defining a passageway corresponding in shape and size to a said cable for receiving thereat an end of a said cable such that fibers of a cable received into the housing member may protrude beyond said support means, and including mechanical holding means for securing the flexible matrix of the cable for thereby anchoring the cable to the housing member, while yet avoiding strain on the fibers such that repeated insertions and withdrawals of the connector from a respective mating connector and associated pressure on the cable is facilitated without weakening of the optical fibers, and (ii) channel means in general alignment with said support means, and for receiving the fibers of a said cable with the ends of the fibers terminating proximate an opening through a front portion of the housing member to enable the fiber ends to be optically coupled to fibers within a mated connector abutting said front portion;

(b) a plurality of fiber retaining members adapted to be positioned within said channel means in the housing member, in axial alignment with the fibers, each of said retaining members having a smooth substantially cylindrical periphery and circular bore extending therethrough along the cylindrical axis and through which an end of an optical fiber of said cable may be inserted and permanently anchored substantially coplanar with one end of the bore, the ends of the fiber and of the retaining member being substantially normal to the axis of the bore;

(c) an alignment means having bores extending therethrough of substantially the same size and shape as the cylindrical periphery of the retaining members for receiving each said fiber retaining members into one end thereof and for receiving into the other end thereof fiber retaining members of a mated connector enabling the respective received members to be substantially butted together to optically couple fibers enclosed therein while maintaining the thus coupled fibers in axial alignment; and (d) engagement means positioned proximate side portions of the housing member having members adapted to be coupled to corresponding members of a said mated connector to cause said retaining members to be aligned with and received into the alignment means and to be maintained in said abutting relationship within the alignment means.

15. In a device for coupling an optical fiber cable containing a plurality of opticl fibers supported in a flexible matrix to a terminal for an optical data link, said device comprising a cable connector portion adapted to receive a said optical fiber cable and a terminal connector portion adapted to transform electrical signals into optical signals and vice versa, each connector portion including a housing member adapted to be mated to the housing member of the other connector portion, each housing member receiving a plurality of fiber retaining members for centering fibers in said cable received into said cable connector portion in relation to a similar plurality of fibers in said terminal connector portion, wherein one of said housings further includes an alignment means having bores extending therethrough of substantially the same size and shape as the periphery of the retaining members for receiving each of said fiber retaining members of said cable connector into one end thereof and for receiving into the other end thereof the fiber retaining members of said terminal, thus enabling the respective received retaining members to be butted together to optically couple together optical fibers centered therein while maintaining the thus coupled fibers in axial alignment, and wherein said terminal connector portion includes means for variably positioning individual optical fibers therein and thereafter anchoring said fibers at a desired position to maximize optical coupling to a selected area of an associated optical element such as a light source or photo detector within said terminal connector portion.

16. In a device according to claim 15, wherein said device is adapted for use with a cable containing a plurality of transversely separated optical fibers, and wherein said housing member of the cable connector portion includes internal support means for physically securing and anchoring said flexible matrix of said cable to said housing member while yet avoiding stain on the fibers such that repeated insertions and withdrawals of the respective connector portions are facilitated without weakening the fibers therein.

17. A connector for use with a cable containing a plurality of transversely separated optical fibers supported in a flexible matrix and disposed parallel to each other, comprising (a) a substantially flat housing member having (i) internal support means defining a passageway corresponding in shape and size to a said cable for receiving thereat an end of a said cable such that fibers of a cable received into the housing member may protrude beyond said support means, and including mechanical holding means for physically securing said flexible matrix of said cable for anchoring said cable to said housing member while yet avoiding strain on the fibers such that repeated insertions and withdrawals of the connector is facilitated without weakening the fibers, and (ii) channel means for receiving the fibers of a said cable with the ends of the fibers terminating proximate an opening through a front portion of the housing member to enable the fiber ends to be optically coupled to fibers within a mated connector abutting said front portion;

(b) a plurality of fiber retaining members adapted to be positioned within said channel means in axial alignment with the fibers, each of said retaining members having a bore extending therethrough and through which an end of an optical fiber of said cable may be inserted and anchored substantially coplanar with one end of the bore, the ends of the fiber and of the retaining member being substantially normal to the axis of the bore;

(c) an alignment means having bores for receiving each said fiber retaining members into one end thereof and for receiving into the other end thereof fiber retaining members of a mated connector enabling the respective received members to be substantially butted together to optically couple fibers enclosed therein while maintaining the thus coupled fibers in axial alignment; and (d) engagement means having members adapted to couple to corresponding members of a said mated connector to cause said retaining members to be received into the alignment means and to be maintained in said abutting relationship.

* * * * *